United States Patent Office 3,714,769
Patented Feb. 6, 1973

3,714,769

METHOD AND APPARATUS FOR CONTINUOUSLY WINDING TAPE ONTO ELONGATED BODY

Seiji Tsuchiya, Kyushu, and Minoru Yabuki and Yoshinori Takada, Yokohama, Japan, assignors to The Furukawa Electric Company Limited, Tokyo, Japan
Filed Apr. 23, 1971, Ser. No. 136,915
Claims priority, application Japan, Apr. 25, 1970, 45/35,638
Int. Cl. B65h *81/08;* H01b *7/26*
U.S. Cl. 57—3 9 Claims

ABSTRACT OF THE DISCLOSURE

A tape is fed from a tape pad inserted in a tape pad holder through concentrically arranged outer and inner guide discs onto an elongated body. Normally, all of the tape pad holder and outer and inner guide discs are rotated at the same speed to wind the tape onto the elongated body. In case of replacing the tape pad with a new one, a relative speed between the outer and inner guide discs is changed to accumulate the tape onto the outer and inner guide discs and then the tape pad holder only is stopped to replace the tape pad with a new one and connect the front end of the tape from the new pad to the rear end of the tape accumulated around the outer guide disc while continuously rotating the outer and inner guide discs and delivering the accumulated tape onto the elongated body.

This invention relates to a method and apparatus for continuously winding a tape onto an elongated body such as electric conductor, cable, gas pipe, city water pipe or any other pipes for use in various industrial fields. It is particularly applicable to insulated electric conductors.

The tape may be of rubber, plastic, paper, fabric, copper, aluminium, iron or any other material.

In general, a conventional tape winding machine comprises a stationary head including a flyer mounted thereon and a tape pad mounted on the flyer, a tape being wound onto an elongated body helically with a constant pitch. In case of replacing the tape pad with a new one, it is necessary to stop the winding operation of the machine. Particularly, in case the elongated body has a large outer diameter such as the core of electric power cable or when a large number of tapes are wound onto the elongated body, the replacement of the pad becomes more complicated and troublesome, thereby remarkably lowering the efficiency of the tape winding machine.

In order to obviate the above-mentioned disadvantage, it has been proposed to provide a tape winding machine as shown in FIG. 1 which comprises a movable head 1 movably mounted on a screw driving shaft 2, a rotatable flyer 3 rotatably mounted on the movable head 1, and rotatable tape pads 4 detachably mounted on the flyer 3, tapes 5 from the tape pads 4 being wound onto an elongated body 6 drawn in the direction of arrow.

In such conventional tape winding machine, if the amount of tapes remaining in the tape pads 4 decreases less than a given amount, the rotation of the flyer 3 is stopped and then a screw driving shaft 2 is driven to move the head 1 in the direction in which the elongated body 6 is drawn. Thus, the drawing speed of the elongated body 6 with respect to the head 1 is gradually decreased in response to the movement of the head 1. During this movement of the head 1 the tape pads 4 are replaced by new ones. The rotation of the flyer 3 is started again after the head 1 has moved over a given distance to wind the tapes 5 onto the elongated body 6 while at the same time the head 1 is moved in a direction opposite to the above-mentioned direction to gradually increase the drawing speed of the elongated body 6 in response to the movement of the head 1. The rotation of the flyer 3 is increased or decreased in response to the movement of the head 1 and also to the change of the drawing speed of the elongated body 6 in such a manner that the pitch of the tapes 5 wound onto the elongated body 6 is kept always constant.

In the conventional tape winding machine shown in FIG. 1 when the tape pads 4 are replaced with new ones, it is necessary to move to and fro the large heavy head 1 with the flyer 3, tape pads 4 and a flyer driving means (not shown), which makes the machine large in size and complex in construction, thus requiring high equipment cost and a large space for installation. This also limits the time for replacement of pads due to the limited movement of the head 1, thus lowering the work efficiency of the machine.

An object of the present invention is to provide a method of continuously winding a tape onto an elongated body for a long time without interrupting the winding operation.

Another object of the present invention is to provide such an apparatus having a tape pad holder and concentrically arranged outer and inner guide discs with which a tape pad may be replaced with a new one without interrupting the winding operation.

A further object of the present invention is to provide such an apparatus in which the tape can be rewound onto the tape pad when it is desired to complete the replacement of the tape pad with the new one within a short time.

A feature of the invention is the provision of such an improved method of continuously winding a tape onto an elongated body comprising the steps of mounting a rotatable tape pad holder with its center axis perpendicular to the elongated body, said holder having a tape pad consisting of a number of tape layers wound into a roll, mounting rotatable outer and inner guide discs concentrically about the elongated body, rotating said tape pad holder and outer and inner guide discs at the same speed about the elongated body to feed and wind the tape from said tape pad holder through said outer and inner guide discs onto said elongated body, increasing or decreasing the rotating speed of said outer guide disc to accumulate the tape as a number of layers wound around said outer and inner guide discs, respectively, and stopping the rotation of said tape pad holder to replace the tape pad with a new tape pad and connect the tapes of said two tape pads while continuously feeding and winding the tape delivered from the inner layer of the tapes accumulated around said outer and inner guide discs onto the elongated body.

Another feature of the invention is the provision of such an improved apparatus for continuously winding a tape onto an elongated body comprising a rotatable tape pad holder mounted with its center axis perpendicular to the elongated body and having a tape pad inserted therein and rotatably and concentrically mounted with respect to the elongated body, guide means having outer and inner discs rotatably and concentrically mounted with respect to the elongated body, and means for driving each of said tape pad holder and outer and inner guide discs. These features of the invention are described in greater detail in the following description of certain embodiments. This description refers to the accompanying drawings, in which:

Figure 2:
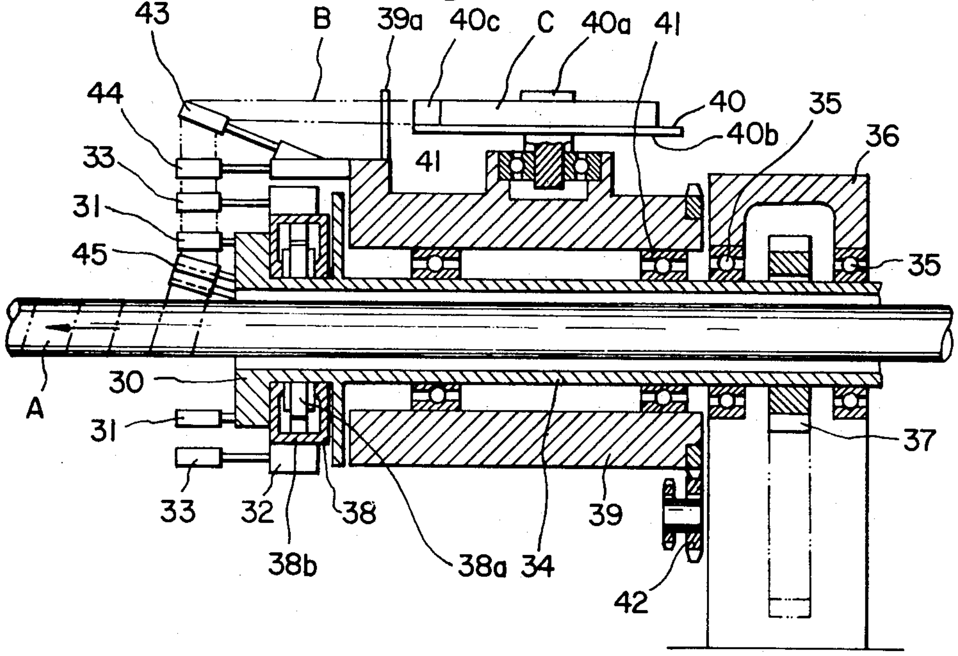
FIG. 2 is a vertical section through apparatus for continuously winding tape onto elongated body according to the invention.
Figure 3:
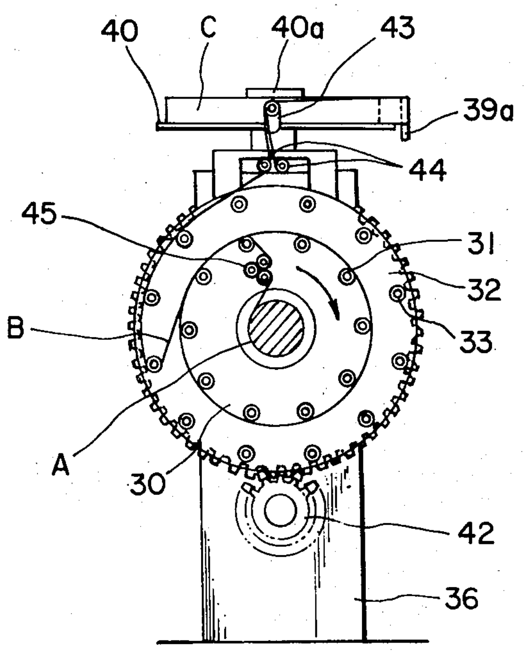
FIG. 3 is an end view of FIG. 2.

Referring now to FIGS. 2 and 3 showing one embodiment of the apparatus according to the invention, 30 designates an inner guide disc provided at its front side with a number of inner rollers 31 rotatably mounted at small intervals along the periphery of the disc 30 with its axis perpendicular to the front side of the disc 30. Around the inner guide disc 30 is concentrically arranged an outer guide disc 32 provided at its front side with a number of outer rollers 33 rotatably mounted at small intervals along the periphery of the disc 32 with its axis perpendicular to the front side of the disc 32.

These two guide discs 30 and 32 are rotatably and concentrically mounted with respect to an elongated body A such as a cable conductor, pipe, etc. onto which is wound a tape B. 34 designates a cylindrical driving shaft made integral with the inner guide disc 30 and journalled in bearings 35 mounted on a stationary head 36 of the machine. The cylindrical driving shaft 34 is driven at its rear end through gears 37 by a torque motor or any other driving means (not shown). The outer guide disc 32 is made integral with a torque motor 38 surrounding the driving shaft 34 of the inner guide disc 30. That is, the torque motor 38 comprises a stator **38*a* made integral with the driving shaft 34 and a rotor 38*b* surrounding the stator 38*a* and made integral with the outer guide disc 32. The presence of the torque motor 38 between the inner and outer guide discs 30 and 32 makes it possible to produce any desired torque for rotating the outer guide disc 32** and change the tape tension to any desired value.

30 designates a rotatable cylindrical shaft for rotatably supporting a tape pad holder 40 and rotatably and concentrically mounted through bearings 41 with respect to the driving shaft 34. **39*a* designates a tape guide pin projected from the cylindrical shaft 39. The rotatable cylindrical shaft 39 is driven through gears 42 by a torque motor or any other driving means (not shown). The tape pad holder 40 consists of a tape pad supporting shaft 40*a* with its axis perpendicular to the elongated body A and a tape pad supporting frame 40*b*. 43 and 44 show guide rollers for guiding the tape B made of paper, plastics, etc. and journalled in the cylindrical shaft 39. 45 shows rollers for guiding the tape B and adjusting the tension thereof and journalled in the inner disc 30**.

Figure 4:
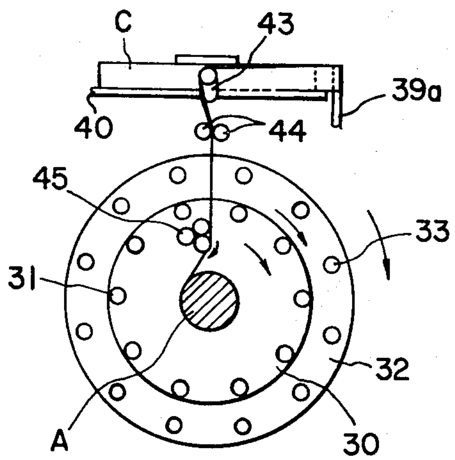
FIGS. 4 to 9 are end views similar to FIG. 3 and showing the operation of the apparatus shown in FIGS. 2 and 3.

The operation of the present embodiment will be described with reference to FIGS. 4 to 9. In the first place, a tape pad C is inserted into the tape pad holder 40 and the end of the tape B is unwound from the tape pad C, passed over the guide pin **40*c* and between the guide rollers 43, outer rollers 33, inner rollers 31, and tension adjusting rollers 45** and lapped by hand round the elongated body A as shown in FIG. 4.

Figure 6:
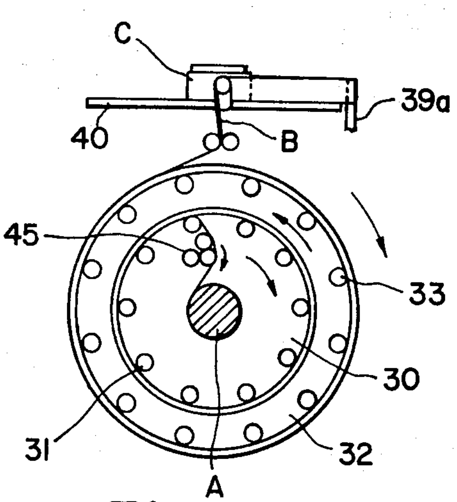
Figure 5:
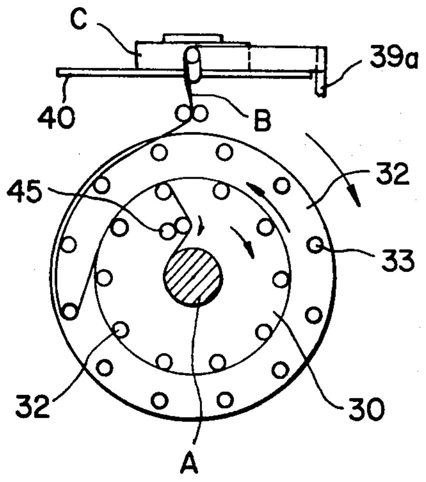
Figure 7:
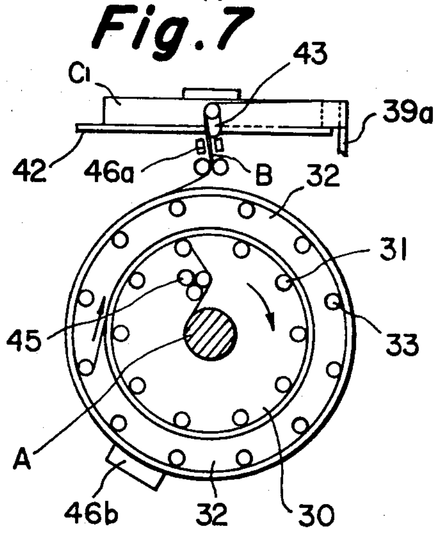

Then, all of the inner and outer guide discs 30, 32 and tape pad holder 40 are rotated at the same speed to wind the tape B onto the elongated body A. When substantially all of the tape B is delivered out of the tape pad C and hence the tape pad C must be replaced with a new one, the rotating speed of the outer guide disc 32 is made lower than that of the tape pad holder 40 and the inner guide disc 30. In the apparatus shown in FIG. 2, the rotor **38*b* is rotated in a direction which is relatively opposite to the rotating direction of the inner guide disc 30. Thus, one of the outer rollers 33 is brought into engagement with the tape B and rotated in the opposite direction as shown in FIG. 5 to wind and accumulate the tape B in a number of layers onto the inner and outer rollers 31, 33 as shown in FIG. 6. Then, the rotation of the tape pad holder 40** is stopped to replace the tape pad C with a new tape pad $C_1$ as shown in FIG. 7. The rear end of the tape B is secured to the front end of the tape from the new tape pad $C_1$ by an adhesive agent.

During the replacement of the tape pad C with the new tape pad $C_1$ the rear end of the tape B is made stationary with the aid of a pair of friction brake arms **46*a* or the tape layers accumulated around the outer rollers 33 are made stationary by means of a friction brake arm 46*b*, while the outer guide disc 32 is slidably rotated with respect to the accumulated tape layers at a speed lower than that of the inner guide disc 30 in the same direction. Thus, during the replacement of the tape pad C with the new tape pad $C_1$, the tape B is delivered from the inner layer of the tape wound around the outer rollers 33 onto the inner rollers 31 and is ultimately delivered from the inner layer of the tape accumulated around the inner rollers 31 onto the elongated body A. In the present embodiment, the input to the torque motor 38 is reduced and the inner guide disc 30 is driven through the cylindrical driving shaft 34 and gears 37 by the driving means (not shown). The rotation of the inner guide disc 30 causes the tape B accumulated on the inner rollers 31 to be wound from its inner layer onto the elongated body A. The outer rollers 33 serve to deliver the tape B accumulated thereon from its inner layer to the inner rollers 31 in response to the amount of tape B delivered from the inner rollers 31 to the elongated body A with the result that the tape B is subjected to a tension which gives a torque to the torque motor 38 in a direction opposite to the torque applied to the rotor 38*b***.

Thus, the tape B is subjected to a proper tension while the outer guide disc 32 is rotated. This operating condition is shown in FIG. 7 in which the rear end of the tape from the tape pad C is secured to the front end of the tape from the new tape pad $C_1$ as described above.

Figure 8:
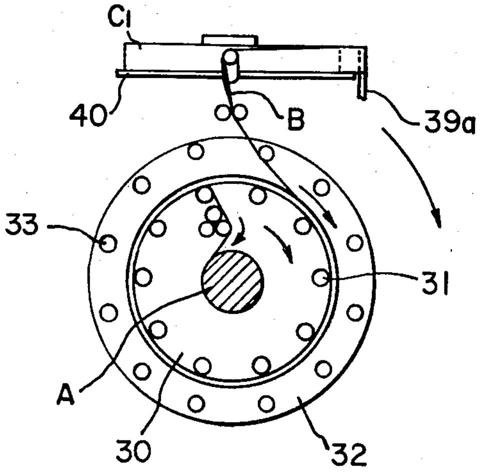
Figure 9:
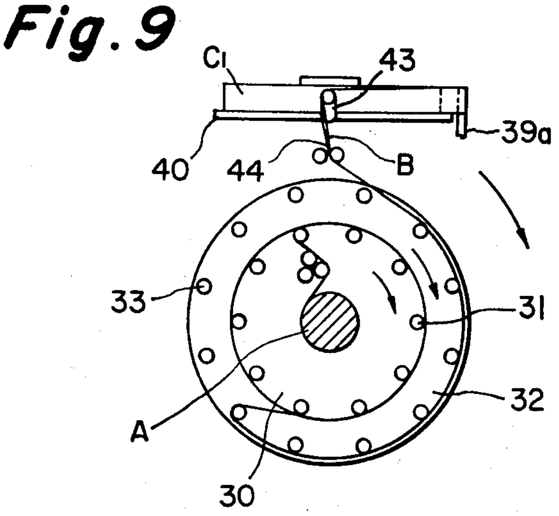

Immediately after all of the tape B accumulated around the outer rollers 33 has been fed onto the inner rollers 31 as shown in FIG. 8, the outer guide disc 32 and the tape pad holder 40 are rotated at a speed higher than that of the inner guide disc 30. In this case, the rotating speed of the outer guide disc 32 and the tape pad holder 40 is increased to such an extent that the resultant increase of its peripheral speed becomes equal to the peripheral speed, of the inner rollers 31.

If the rotation of the tape pad $C_1$ against the friction brake (refer to FIG. 10, **65*c*) is stopped and the tape pad holder 40 is rotated in the direction of arrow (FIG. 9), one of the outer rollers 33** is brought into engagement with the tape B to apply the tension thereto.

As soon as substantially all of the tape B accumulated around the inner rollers 31 is delivered and wound onto the elongated body A, all of the inner and outer guide discs 30 and 32 and tape pad holder 40 are rotated again at the same speed as shown in FIG. 4 to wind the tape B onto the elongated body A and the above-mentioned sequence of the steps is repeated.

In case of accumulating the tape B around the inner and outer guide discs 30, 32 for the purpose of replacing the tape pad C with the new tape pad $C_1$, the rotating speed of the outer guide disc 32 may be made higher than those of the tape pad holder 40 and the inner guide disc 30.

Figure 10:
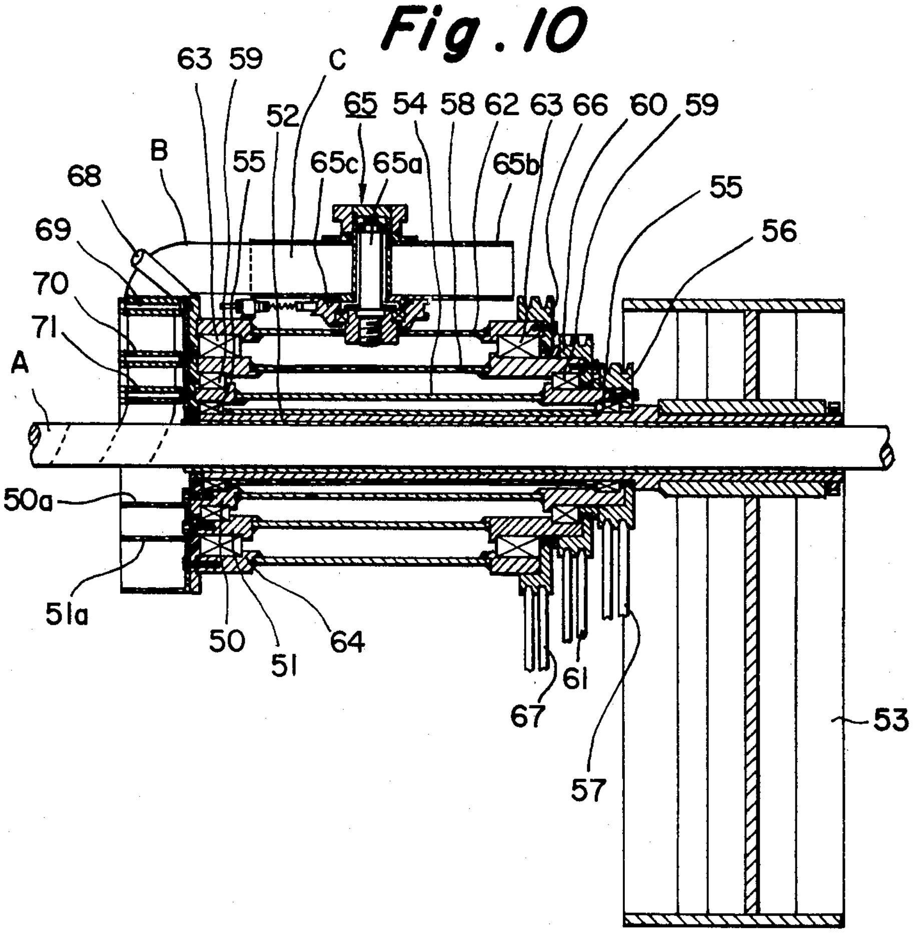
FIG. 10 is a vertical section through another embodiment of the invention.
Figure 11:
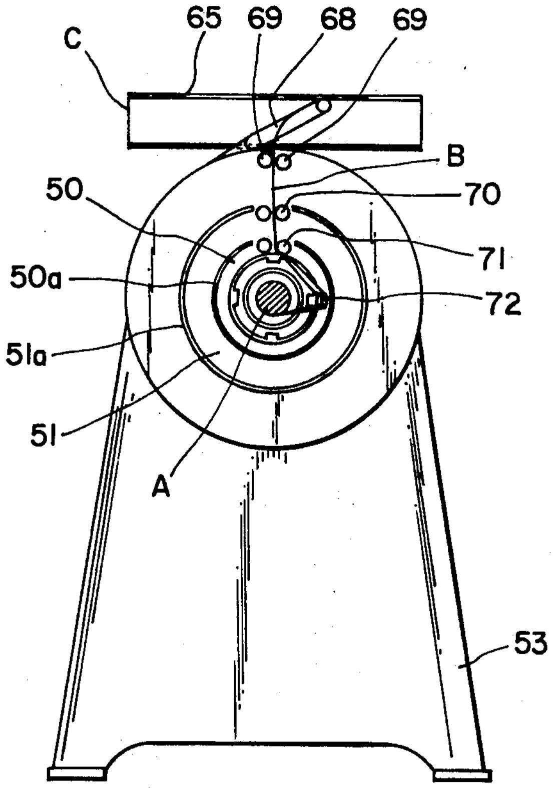
FIG. 11 is an end view of FIG. 10.

Referring to FIGS. 10 and 11 showing another embodiment of the apparatus according to the invention, 50 designates a hollow inner guide disc having on its front end an inner ring **50*a* whose width is large enough to be slidably engaged with the tape. 51 is a hollow outer guide disc having on its front end an outer ring 51*a* whose width is large enough to be slidably engaged with the tape. These two discs 50 and 51** are rotatably and concentrically mounted with respect to an elongated body A.

52 designates a stationary cylindrical shaft secured at its rear end to a stationary head 53 and surrounded by a rotatable cylindrical shaft 54 journalled in bearings 55. This cylindrical shaft 54 is provided at its front end with the inner guide disc 50 secured thereto and provided at its rear end with a belt pulley 56 secured thereto. The belt pulley 56 is driven through an endless belt 57 by a torque motor or any other driving means (not shown) to rotate the inner guide disc 50. 58 designates a rotatable cylindrical shaft journalled in bearings 59 and concentrically mounted so as to surround the cylindrical shaft 54. The cylindrical shaft 58 is provided at its front end with the outer guide disc 51 secured thereto and provided at its rear end with a belt pulley 60 driven through an endless belt 61 by a torque motor or any other driving means (not shown) to rotate the outer guide disc 51.

62 designates a rotatable cylindrical shaft journalled in bearings 63 and rotatably and concentrically mounted so as to surround the cylindrical shaft 58. The cylindrical shaft 62 is provided at its front end with a hollow guide disc 64, at its intermediate portion with a tape pad holder 65 and at its rear end with a belt pulley 66 driven through an endless belt 67 by a torque motor or any other driving means (not shown) to rotate the tape pad holder 65. The tape pad holder 65 consists of a tape pad supporting shaft **65*a* with its center perpendicular to the elongated body A, a tape pad supporting frame 65*b*, and a friction brake mechanism 65*c*. 68 and 69 show guide rollers rotatably mounted on the guide disc 64, 70 guide rollers rotatably mounted on the outer guide disc 51, and 71 and 72 guide rollers rotatably mounted on the inner guide disc 50. These guide rollers serve to guide a tape B delivered from a tape pad C inserted in the tape pad holder 65** toward the elongated body A and wind it onto the latter.

Figure 1:
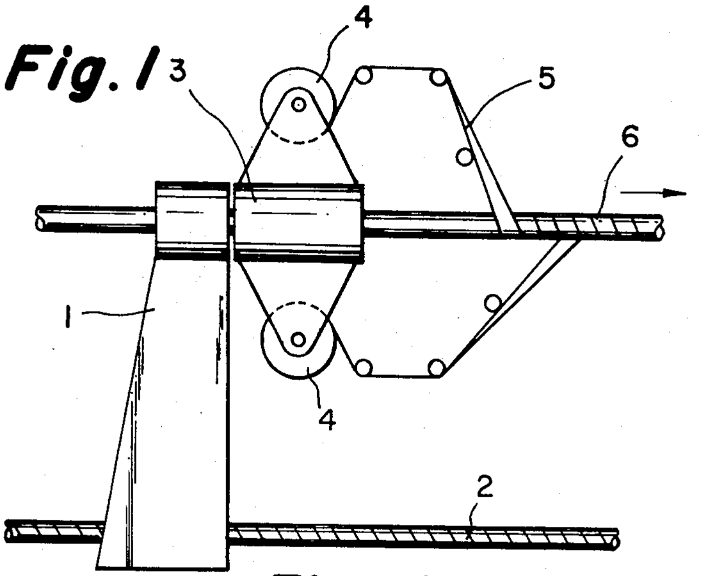
FIG. 1 shows diagrammatically side elevation of a conventional tape winding machine.

The operation of the present modified embodiment is substantially the same as that of the apparatus shown in FIG. 1 and described with reference to FIGS. 4 to 9.

That is, in the first place, the tape pad C is inserted into the tape pad holder 65 and the end of the tape B is unwound from the tape pad C, passed over the guide roller 68 and between the guide rollers 69, guide rollers 70, and guide rollers 71 and over the guide roller 72 and lapped by hand round the elongated body A as shown in FIG. 11.

Then, all of the inner and outer guide discs 50, 51 and tape pad holder 65 are rotated at the same speed to wind the tape B onto the elongated body A.

If substantially all of the tape B is delivered out of the tape pad C and hence the tape pad must be replaced with a new tape pad, the rotating speed of the outer guide disc 51 is made lower than those of the tape pad holder 65 and the inner guide disc 50. That is, the number of rotations of the torque motor (not shown) for driving the endless belt 61 is made smaller than that at its normal operation to wind and accumulate the tape B in a number of layers onto the inner ring **50*a* of the inner guide disc 50 and the outer ring 51*a* of the outer guide disc 51**.

Then, the rotation of the tape pad holder 65 is stopped to replace the tape pad C with a new tape pad. The rear end of the tape of the tape pad C is secured to the front end of the tape of the new tape pad by an adhesive agent. During the replacement of the tape pad C with the new tape pad the rear end of the tape B is made stationary with the aid of a pair of friction brake arms **46*a* (FIG. 5) or the tape layers accumulated around the outer disc 51 is made stationary with the aid of a friction brake arm 46*b* (FIG. 7), while the outer guide disc 51 is slidably rotated with respect to the tape layers accumulated thereon at a speed lower than that of the inner disc 50 in the same direction. Thus, during the replacement of the tape pad with the new tape pad, the tape B is delivered from the inner tape layer accumulated around the outer guide disc 51 onto inner guide disc 50 and then is delivered from the inner tape layer accumulated around the inner guide disc 50** onto the elongated body A.

Immediately after all of the tape B accumulated around the outer disc 51 has been fed onto the inner guide disc 50, the outer guide disc 51 and the tape pad holder 65 are rotated at a speed higher than that of the inner guide disc 50. In this case, the rotating speed of the outer guide disc 51 and the tape pad holder 65 is increased to such an extent that the resultant increase of its peripheral speed becomes equal to the peripheral speed of the guide rollers 71.

As soon as substantially all of the tape B accumulated around the inner guide disc 50 is delivered and wound onto the elongated body A, all of the inner and outer guide discs 50 and 51 and tape pad holder 65 are rotated again at the same speed to wind the tape B onto the elongated body A and the above-mentioned sequence of the steps is repeated.

Figure 12:
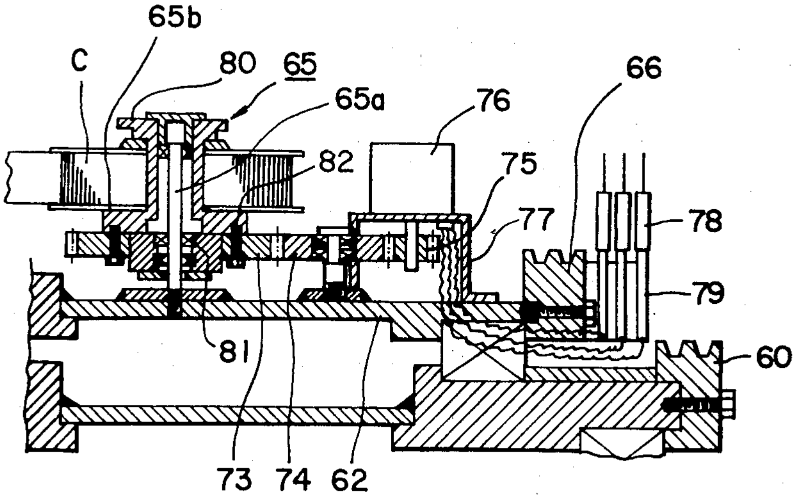
FIG. 12 is a fragmentary vertical section showing a modification of FIG. 10.

In FIG. 12 there is shown a variant of the tape pad holder 65 shown in FIG. 10.

To the lower portion of the tape pad holder 65 is secured a gear 73 which is engaged through an intermediate gear 74 with a gear 75 secured to a torque motor 76. The torque motor 76 is secured through a bracket 77 to the rotatable cylindrical shaft 62 and adjustably controlled by a current supplied from an electric power source (not shown) through brushes 78 and a slip ring 79 secured to the belt pulley 66. 80 designates a nut for clamping the tape pad C upon the tape pad supporting frame **65*b***.

As stated hereinbefore, immediately after all of the tape B accumulated around the outer guide disc 51 has been fed onto the inner guide disc 50, the outer guide disc 51 and the tape pad holder 65 are rotated at a speed higher than that of the inner disc 50 for the purpose of delivering and winding the tape B accumulated around the inner guide disc 50 onto the elongated body A. But, it requires a long time to deliver and wind substantially all of the tape B accumulated around the inner guide disc 50 onto the elongated body A. In order to complete this operation and bring it into a normal state wherein all of the inner and outer guide discs 50 and 51 and the tape pad holder 65 are rotated at the same speed to wind the tape B onto the elongated body A, it is necessary to rotate the outer guide disc 51 and the tape pad holder 65 at a speed which is higher than the above-mentioned high speed. In this case there is risk that the tape B becomes out of engagement with the outer guide disc 51, hence the tape B being entangled and broken. This disadvantage is avoided when the torque motor 76 shown in FIG. 12 is energized to rotate through the gears 75, 74 and 73 the tape pad support frame **65*b* so as to rewind the tape B onto the tape pad C thereby reducing the amount of the tape layers accumulated on the inner guide disc 50** within a short time.

As explained hereinbefore, the use of tape pad holder 65 shown in FIG. 12 ensures rapid restoration of the outer and inner guide discs 51, 50 into the normal winding operation in which no tape B is present around both discs and provides an economical way of winding the tape B in a stable state without causing any inconvenience such as variation of the tape tension, breakage of the tape, etc. The apparatus shown in FIG. 12 may also be applied to the apparatus shown in FIGS. 2 and 3.

As stated hereinbefore, the method according to the present invention comprises the steps of increasing or decreasing the rotating speed of an outer guide disc to accumulate tapes around the outer guide disc and an inner disc, and stopping the rotation of a tape pad holder to replace a tape pad with a new tape pad and connect the rear end of the tape pad to the front end of the new tape pad while delivering the tape from the inner layers accumulated around the outer and inner guide discs. Thus, the method according to the present invention makes it possible to continuously wind the tape onto an elongated body for a long time without stopping the tape winding machine thus remarkably improving the work efficiency of the tape winding machine.

The apparatus according to the present invention comprises a stationary head secured to a machine base and provides the important advantage that the apparatus is simple in construction and small in size and hence can remarkably reduce the installation cost, and that the apparatus may be continuously operated for a long time with the result that the length of the elongated body to be wound by the tape may be made very long as far as it can be manufactured and transported without any trouble.

The embodiments illustrated and described herein are illustrations only of the invention, and other embodiments will occur to those skilled in the art. No attempt has been made herein to go into all possible embodiments, but rather only to illustrate the principles of the invention and the best manner now known to practice it.

What is claimed is:

1. A method of continuously winding a tape onto an elongated body comprising the steps of mounting a rotatable tape pad holder rotatably with respect to the elongated body, with its center axis perpendicular to the elongated body, said holder having a tape pad consisting of a number of tape layers wound into a roll, mounting rotatable outer and inner guide discs rotatably and concentrically with respect to the elongated body, normally rotating all of said tape pad holder and outer and inner guide discs at the same speed about the elongated body to feed and wind the tape from said tape pad holder through said outer and inner guide discs onto said elongated body and in case of replacing the tape pad with a new one, increasing or decreasing the rotating speed of said outer guide disc to accumulated the tape in a number of layers wound around said outer and inner guide discs, respectively, and stopping the rotation of said tape pad holder to replace the tape pad with a new tape pad and connect the tapes of said two tape pads while continuously feeding and winding the tape delivered from the inner layers of the tapes accumulated around said outer and inner guide discs onto the elongated body.

2. A method as claimed in claim 1, in which the rotating speed of said outer guide disc and tape pad holder is made higher than the speed of the inner guide disc which delivers the tape accumulated thereon from its inner layer while forcedly rotating said tape pad holder correlatively in an opposite direction to rewind the tape around the tape pad and reduce the amount of the tape layers accumulated on the inner guide disc within a short time.

3. Apparatus for continuously winding a tape onto an elongated body comprising a rotatable tape pad holder rotatably mounted with respect to the elongated body, with its center axis perpendicular to the elongated body, and having a tape pad inserted therein, guide means having outer and inner guide discs rotatably and concentrically mounted with respect to the elongated body, and means for driving each of said tape pad holder and outer and inner guide discs.

4. The apparatus of claim 3 and further comprising at least one cylindrical shaft rotatably and concentrically mounted with respect to the elongated body and provided at respective front end with said outer and inner guide discs and at respective rear end with said driving means.

5. The apparatus of claim 3, wherein the outer and inner guide discs of said guide means are provided along the peripheral edges thereof with a number of rollers each having a center axis which is perpendicular to the surface of respective disc.

6. The apparatus of claim 3 wherein said outer guide discs are secured to a rotor of a torque motor, said rotor being rotatably mounted on a hollow cylinder and said inner guide discs are secured to a stator of said torque motor, said stator being secured to said hollow cylinder.

7. The apparatus of claim 3 wherein said outer guide discs are secured to the front end of a first hollow rotatable cylinder and said inner guide discs are secured to the front end of a second hollow rotatable cylinder, said first hollow cylinder being arranged around said second hollow cylinder and driven at its rear end through a belt pulley and endless belt by a driving means, said second hollow cylinder being driven at its rear end through a belt pulley and endless belt by a driving means.

8. The apparatus of claim 7 and further comprising a third hollow cylinder rotatably mounted around said first and second hollow cylinders and provided at its front end with a hollow guide disc, at its intermediate portion with a tape pad holder and at its rear end with a belt pulley driven through an endless belt by a driving means.

9. The apparatus of claim 3 and further comprising a torque motor whose rotor shaft is connected through a plurality of gears to a tape pad holder secured to the first gear.

References Cited

UNITED STATES PATENTS

| | | | |
|---|---|---|---|
| 3,273,814 | 9/1966 | Prusak et al. | 57—3 X |
| 2,318,316 | 5/1943 | Lawrence, Jr. | 242—55.19 X |
| 3,099,190 | 7/1963 | Allen, Jr. et al. | 242—7.23 X |
| 3,296,784 | 1/1967 | Guiton | 57—18 |

FOREIGN PATENTS

| | | | |
|---|---|---|---|
| 688,292 | 3/1953 | Great Britain | 242—7.23 |

WERNER H. SCHROEDER, Primary Examiner

U.S. Cl. X.R.

57—19, 160; 242—7.23